Figures 1, 2:
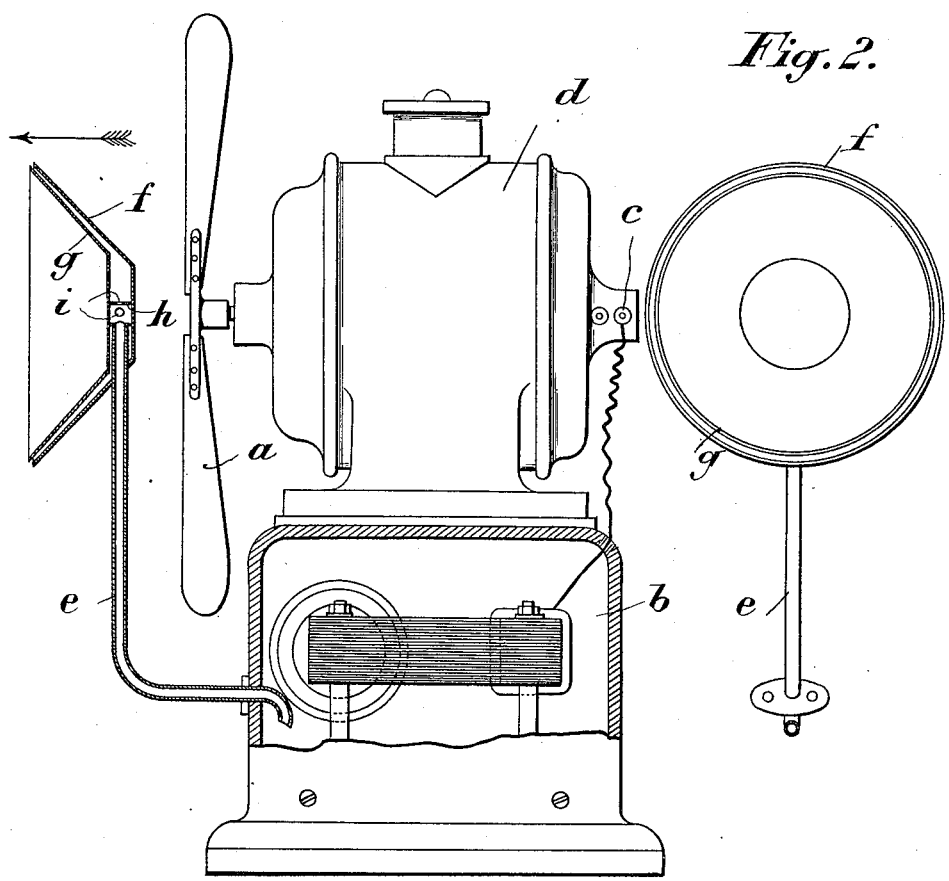

F. G. JÄNICH.
APPARATUS FOR PURIFYING AIR.
APPLICATION FILED MAY 15, 1911.

1,001,038.

Patented Aug. 22, 1911.

UNITED STATES PATENT OFFICE.

FRIEDRICH GEORG JÄNICH, OF RHEYDT, NEAR DUSSELDORF, GERMANY, ASSIGNOR TO OTTO VON MÜLMANN, OF BRUSSELS, BELGIUM.

APPARATUS FOR PURIFYING AIR.

1,001,038.      Specification of Letters Patent.      Patented Aug. 22, 1911.

Application filed May 15, 1911. Serial No. 627,242.

*To all whom it may concern:*

Be it known that I, FRIEDRICH GEORG JÄNICH, subject of Germany, residing at Rheydt, near Dusseldorf, Germany, have invented certain new and useful Improvements in Apparatus for Purifying Air, of which the following is a specification.

This invention relates to an apparatus for the production and distribution of ozone in the air of a room or the like and its intimate mixing with this air with the object of purifying the latter.

This apparatus consists broadly of a fan combined with an ozonizer in such a manner that the air displaced by the fan draws the ozone from the discharge conduit of the ozonizer which produces an intimate mixing of the ozone and air. The fan is placed above the ozonizer and the discharge conduit of the latter opens in front of the blades of the fan behind a funnel-shaped screen with closed bottom arranged co-axially with the fan at a small distance therefrom in such a manner that the eddies of the air produced by the rotation of the blades of the fan strike against the closed bottom and the outer walls of the funnel thus producing a partial vacuum in the latter and consequently a suction of ozone out of the discharge conduit of the ozonizer.

In order to increase the suction of the ozone and to render its distribution in the air more uniform a second screen of the same shape as the first is fitted into the latter but is separated from every part thereof by a small interval in such a manner that the discharge conduit of the ozonizer opens between the closed bottoms of the two screens and the ozone is drawn between the inner walls of the first screen and the outer walls of the second screen and escapes between their outer edges directly into the current of air produced by the fan.

An embodiment of the invention is illustrated by way of example in the accompanying drawing in which:

Figure 1 is a side elevation of the apparatus partly in section and Fig. 2 is a front elevation of the distributing screens and of the discharge conduit of the ozonizer.

In this embodiment of the invention the fan $a$ is mounted directly upon the ozonizer $b$ which serves as a bracket. The ozonizer consists of a small transformer the low tension coil of which is connected with the terminals $c$ of the electric motor $d$ of the fan while its high tension coil is connected with glass plates covered with tin or an equivalent substance.

$e$ is the discharge conduit for the ozone which ascends in front of the blades of the fan; at its upper end the screens $f$ and $g$ are mounted co-axially with the said blades and connected one with the other and with the conduit $e$ by a short tube $h$ with orifices $i$.

When the fan is operated the displacement of the air produces suction in the direction indicated by the arrow in Fig. 1 and the ozone drawn from the conduit $e$ is uniformly distributed throughout the air in proportions that may be caused to vary at will by modifying the speed of the fan or the production of ozone.

What I claim and desire to secure by Letters Patent of the United States is:—

1. An apparatus for the distribution of ozone in the air comprising in combination a fan, an ozonizer with discharge conduit opening in front of the blades of this fan and a funnel-shaped screen with closed bottom arranged between the said blades and the discharge conduit.

2. An apparatus for the distribution of ozone in the air comprising in combination a fan, an ozonizer with discharge conduit opening in front of the blades of this fan and a screen formed by two funnels with closed bottoms fitted one within the other and separated from each other by an interval into which the discharge conduit of the ozonizer opens.

3. An apparatus for the distribution of ozone in the air comprising in combination a fan, an ozonizer the discharge conduit of which opens in front of the blades of this fan, a funnel-shaped screen with closed bottom arranged between the said blades and the discharge conduit and a second funnel shaped screen with closed bottom fitted into the first and separated therefrom by a space into which the said discharge conduit opens.

4. An apparatus for the distribution of ozone in the air comprising in combination an electric fan, a bracket upon which this fan rests, an ozonizer housed in this bracket, its discharge conduit opening in front of the blades of the said fan and a screen formed of two funnels with closed bottoms fitted one within the other and separated from each other by an interval into which the discharge conduit of the ozonizer opens.

In testimony whereof I affix my signature in presence of two witnesses.

FRIEDRICH GEORG JÄNICH.

Witnesses:
H. T. E. KIRKPATRICK,
FRITZ PFAU.

Copies of this patent may be obtained for five cents each, by addressing the "Commissioner of Patents, Washington, D. C."